United States Patent Office 3,383,905
Patented May 21, 1968

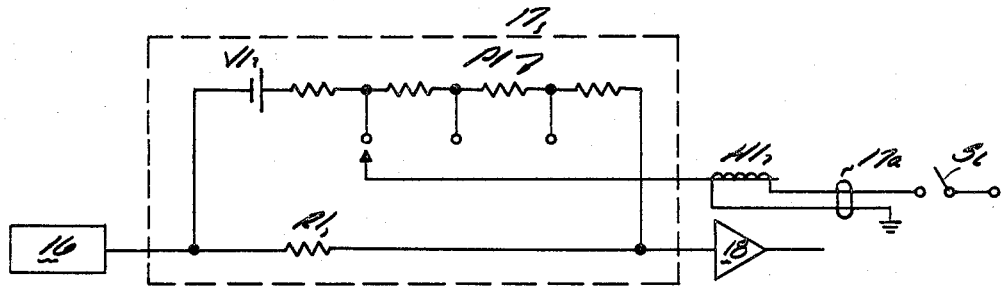
Fig. 2
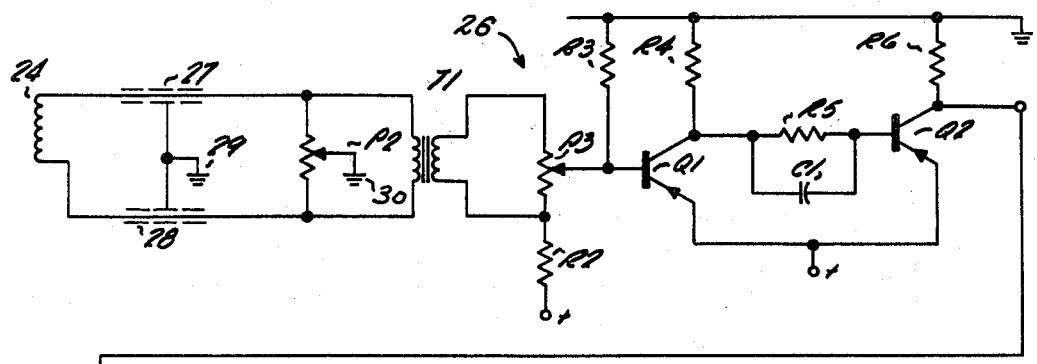
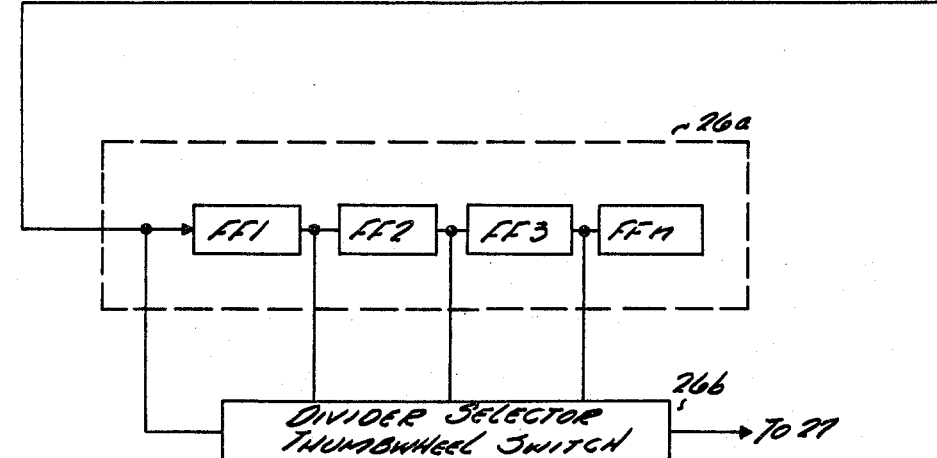
Fig. 3

3,383,905
HYDROSTATIC TESTING SYSTEM
Gerald H. Servos, Elmhurst, and William R. Doenges, Glen Ellyn, Ill., assignors to Instrumentation and Control Systems, Inc., Villa Park, Ill., a corporation of Delaware
Filed Feb. 23, 1966, Ser. No. 529,459
9 Claims. (Cl. 73—37)

ABSTRACT OF THE DISCLOSURE

A pressure vessel is pressurized by a constant displacement pump. A pressure transducer senses the pressure and operates a servo system which drives the scribe of a recorder. Digital means measure the revolutions of the pump and drive the chart of the recorder. Therefore, the recorder indicates the pressure versus volume characteristics of the vessel under test.

---

This invention relates to hydrostatic testing systems, and more particularly to systems for automatic nondestructive hydrostatic testing of pipeline.

The hydrostatic testing of pressure vessels such as pipes used in pipelines was done at the mills until the relatively recent past. The mill testing obviously failed to locate "flaws" in the pipes caused by construction malpractices occurring in the field. Now the pipelines are field tested. The increased use of pipelines has increased the necessity for such field tests and the systems used for accomplishing the tests.

Hydrostatic testing of pressure vessels consists of "field testing" sections of the pipelines. Field testing is done by sealing off a section of pipe, and pumping water into the sealed off section. As the volume of water increases the pressure on the pipe increases, proportionally, that is, on a straight line basis until the elastic limit of the pipe is reached. When the elastic limit of the pipe is reached then the volume of water increases more than the proportional pressure increase. The yield strength is by definition the stress required to cause 0.2 percent permanent strain in the specimen. If this does not occur within certain specified limits on the pressure versus volume curve the specimen tested is considered satisfactory. Thus, the test results are a plot of pressure versus volume.

In addition to the "yield strength test," leak tests are run. That is, if a significant deviation occurs in the pressure versus volume curve, the pump is shut down and a pressure versus time test is conducted instead of a pressure versus volume test. Normally, such tests are run for thirty minutes or one hour periods.

The tests are conducted using automatic recorders to obtain permanent polygraphic records of the tests. The automatic recording equipment used to date has been complicated, expensive and susceptible to adverse environmental conditions and to noise problems. In addition, it has been relatively difficult and burdensome to vary the equipment to insure amenability to the testing of different size pipes, or pipes of different materials.

Accordingly, an object of this invention is to provide new and novel automatic hydrostatic test equipment.

A more particular object of this invention is to provide automatic hydrostatic test equipment that is relatively immune to "noise" and "in field" environmental problems.

Yet another object of this invention is to provide automatic hydrostatic test equipment wherein the distance from the measuring equipment to the test equipment is less critical.

A further object of this invention is to provide automatic hydrostatic test equipment that can be readily adapted for use with pipes or pressure vessels of different sizes and/or materials.

In accordance with one exemplary embodiment of the invention, means are provided for automatically recording the pressure versus volume characteristics of a pressure vessel under test on a greatly enlarged scale. The pressure is accurately and continuously determined with a pressure transducer. The output of the transducer actuates servo recorder inscriber driving means. The pressures rise as a function of the volume of fluid, such as water, that is pumped into the section of pipe. Thus, the more fluid pumped into the pipe the greater the pressure. The pressure-volume relationship is constant until the elastic limit of the pipe is surpassed. The pump used is a constant displacement type pump. Therefore, the value of the volume is obtained in digital increments by attaching a special "gear" and magnetic pick-up to the pump. Thus, from the number of revolutions of the pump, the volume of water pumped into the pipe section is readily obtained. The digital output of the pick-up is amplified to drive a digital step motor. The step motor in turn drives the paper drive mechanism of the recorder. Thus, the recording obtained as a result of the inscriber movement and the step motor movement is the desired pressure versus volume characteristics of the section of pipe under test. The digital input can be easily varied for tests on different size, length and material of pipes by either merely changing the number of "gear" teeth or electrically by means of an electrical divider circuit within the pick-up pulse amplifier.

To conduct a leak test the step motor input is derived from a timing pulse generator clock instead of from the magnetic pick-up. The result is a "pressure versus time" characteristic.

The above enumerated objects and features of the invention will be readily understood from the following detailed description presented hereinafter in conjunction with the accompanying drawings, wherein:

FIGS. 1a and 1b are variations of gear wheels used to measure the revolutions of the constant displacement pump of FIG. 1;

FIG. 2 is a schematic showing of one embodiment of block 17 of FIG. 1; and

FIG. 3 is a schematic diagram of a pulse amplifier which may be used in the pulse amplifier block of FIG. 1.

Figure 1:
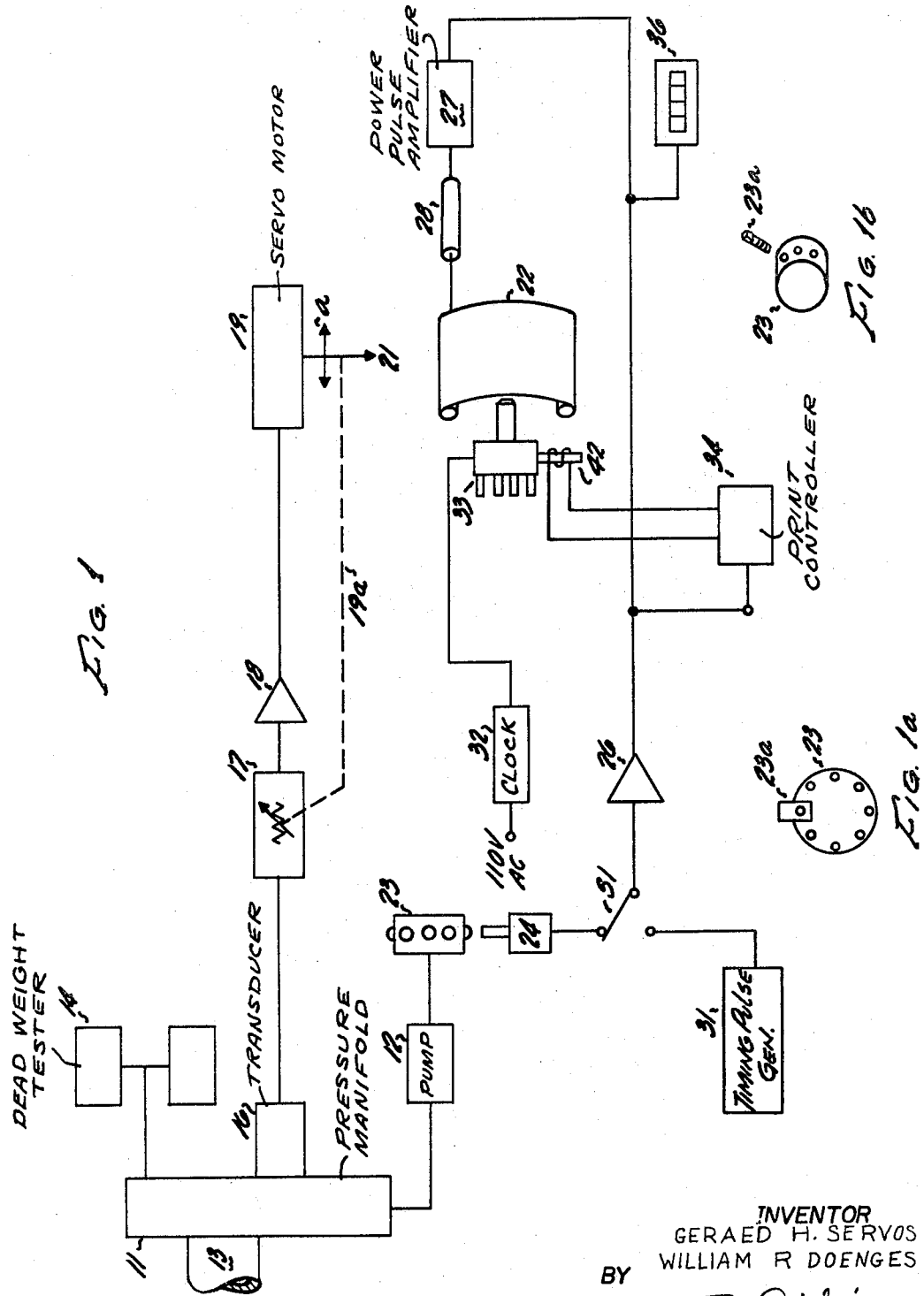
FIG. 1 is a block diagram of the hydrostatic testing system in accordance with the invention.

As shown in FIG. 1, means, such as pressure manifold 11 are provided for coupling the high pressure source such as pump 12, to the high pressure vessel or section of pipe 13 under test. The pump 12 is a constant displacement type of pump, such as a positive displacement piston type constant delivery pump. Thus, a constant volume of fluid is moved per revolution of the pump. The pump 12 may be moved by various different prime movers, such as electric motors or gasoline engines. For most hydrostatic tests of this nature, electric motors (not shown) are used.

Means, such as dead weight tester 14, is also coupled to the pressure manifold 11. The dead weight tester 14 serves as a principal calibrator means to monitor the pressure transducer 16 connected into the manifold and to definitely ascertain that the final pressures are correct. The pressure transducer in an exemplary model of the inventive equipment was of the strain gauge variety, that is commercially available and well known to those skilled in the art.

Potentiometer means, such as potentiometer 17, is provided at the output of the transducer 16 to condition and calibrate the output signal received from the transducer. The output of the potentiometer 17 may be connected to a power amplifier such as power amplifier 18. The output of the amplifier 18 drives a servomotor, such as servomotor 19. The servomotor 19 is used to drive pen 21, back and forth across the chart. As indicated by the horizontal line *a* drawn above the inscriber or pen 21, schematically depicted by a vertical downward pointed arrowhead.

As the stress or pounds per square inch pressure on the pipe section increases, the pen 21 is moved toward the right. As the pressure applied to the pipe section under test increases by a definite increment, for example, 200 p.s.i., the pen is driven across the chart to its extreme right edge. As indicated by the dotted line 19a the potentiometer 17 wiper may be electrically coupled to the pen or inscriber 21 to cause the wiper of the potentiometer 17 to move to increase the bucking voltage to the servo system causing it to return the pen to the left edge of the chart.

The change in bucking voltage is best seen in FIG. 2. As shown in FIG. 2 potentiometer 17 comprises a bucking voltage such as battery source V1. The polarity of battery V1 is opposite in polarity to the voltage output of transducer 16. The battery V1 is connected in series with potentiometer P1. The series circuit bridges resistor R1. The potentiometer P1 can be adjusted to enable the voltage of battery V1 to cancel out the output of transducer 16 or else to reduce the effect of the voltage of battery V1 until it is practically negligible. This, of course, occurs when the resistance of potentiometer P1 in the circuit bridging resistor R1 is large compared to the value of resistor R1.

The potentiometer P1 wiper is electrically coupled to the inscriber 21 and arranged to be stepped to buck out a larger part of the transducer output every time the inscriber reaches the far right edge of the chart. There a limit switch SL is actuated to complete an operating circuit from battery to ground through coil of solenoid H1 and conductor 17a.

Thus, as the pressure over the pipe increases, the pen is driven by the servo-system across the paper of the chart, only to begin again at the right side of the chart. As will be explained hereinafter, the chart is being moved all this time as a function of the volume of fluid being forced into the section of pipe under test. Thus, the graph resembles a series of parallel lines until the limit of elasticity of the pipe is reached.

The movement of the chart is accomplished on a digital basis as a function of the number of revolutions of pump 12. In greater detail, means are provided for digitally measuring the revolutions of pump 12. A gear 23 is connected to the pump to rotate with the axis of the pump. A magnetic pick-up unit 24 senses each gear tooth as the gear rotates. For example, the passing of each tooth past the magnetic pick-up unit could act to vary the reluctance of a coil core leading to a variation in the current through the coil. For the purposes of this invention it does not matter exactly how the magnetic pick-up operates; what is important is that it operates to provide a digital output rather than an analog output.

Among the advantages of digital operation over analog opertion is that the digital operation is less sensitive to noise and other adverse environmental conditions. Thus, for example, the magnetic pick-up can be made extremely sensitive without having to suffer from noise interference problems.

Another advantage in the use of a magnetic pick-up at this juncture is the ease with which the coupling ratio of the gear wheel can be changed without having to modify or move components as is necessary when a selsyn or any analog type pick-up is used.

For example, if a different dimensioned pipe is to be tested, it is simply necessary to add or subtract pulse generating coins (screws) in a non-ferrous wheel or cylinder or disk. On the other hand, when selsyn pick-ups are used, the gear trains have to be changed for testing different size pipes or pipes of different materials.

FIGS. 1a and 1b show different types of revolution sensing disks or wheels that can be used. FIG. 1a shows a non-ferrous disk having a plurality of holes adjacent to the outer periphery thereof. Ferrous cam sections such as cam section 23a are readily attached to the disk 23. The number of cam sections used can be readily and easily varied.

FIG. 1b shows a non-ferrous drum or cylindrical section having a plurality of topped holes in the outer periphery thereof. Ferrous screws 25a serve to provide the pulses to the magnetic pick-up. As can be seen, the number of screws can be easily changed.

Means, such as pulse amplifier 26, are provided for amplifying the output of the magnetic pick-up. FIG. 3 shows the details of an exemplary amplifier actually used.

As shown in the schematic of FIG. 3 the magnetic pick-up unit 24 is coupled to the amplifier 26 through a buffer transformer arrangement comprising transformers T1. The actual coupling is made through shielded leads 27, 28. The shielded leads have their shield grounded at some convenient point 29. Another ground 30 is provided for grounding out any hum which may be present due to any unbalance. The hum is ground out through hum balance potentiometer P2.

A potentiometer P3 bridges the secondary of transformer T1. The base of a PNP transistor Q1 is coupled to a positive bias potential through the wiper of the potentiometer P3 and resistor R2. The potentiometer P3 adjusts the gain of the amplifier. The base of transistor Q1 is connected to ground through resistor R3. The emitter is connected directly to positive potential. The collector is coupled to ground through load resistor R4 and coupled to the base of a second PNP transistor Q2 through resistor R5. Resistor R5 is bridged by a feedback capacitor C1. The emitter of the second transistor is coupled directly to positive potential. The collector of transistor Q2 is coupled to ground through load resistor R6.

When the negative pulses from the magnetic pick-up are received through transformer T1 they vary the bias of the transistor Q1 to cause more current to flow through transistor Q1. The larger current flow through transistor Q1 increases the IR drop across resistor R4 driving the base of transistor Q2 toward ground which in turn causes more current to flow through transistor Q2. Thus, amplifier 26 amplifies the digital signals received from the magnetic pick-up 24.

Means are provided for electronically changing the "gear ratio" of the digital magnetic pick-up arrangement. In greater detail, the output of transistor Q2 is the amplified output such as that obtained from the magnetic pick-up 24. This digital output is fed into counter 26a. The counter is comprised of a plurality of flip-flops FF1 to FF*n* serially connected. A divider selector thumbwheel switch 26b such as those manufactured by Chicago Dynamics Co. is used to obtain the pulse ratio output received by the type of pipe under test. For example, when a 1:1 ratio is required the output is obtained directly from the collector of transistor Q2. When a smaller ratio is required the output is taken from one of the flip-flops, FF1 to FF*n*.

The output of amplifier 26 is connected to a power pulse amplifier 27. The output of the power pulse amplifier is used to drive a digital step motor 28 which, in turn, drives the recorder spool 22 as a function of the revolution of the pump. Because a constant displacement pump is used the recorder spool is driven as a function of volume.

For the leak test, switch S1 is operated to connect the digital output of timing pulse generator 31 to the amplifier 26. The output of generator 31 causes the motor 28 to drive the spool as a function of the digital timing pulses. Thus, when the switch S1 is connected to the time pulse generator a graph of pressure versus time is obtained.

Means are provided for recording the elapsed time during the test. In greater detail, a synchronous clock 32 operated from 160 volt A.C. power is provided for continuously driving a printing wheel 33. The printing wheel is operated to print the time on the chart responsive to the receipt of a command signal from print controller 34 through solenoid H2. The print controller can be operated either manually or automatically responsive to the output of digital amplifier 26. Thus, the elapsed test time is readily obtained on the chart as part of the holygraphic test record.

Means, such as digital counter 36, are provided for automatically counting the number of revolutions of pump 12. This is one of the advantages of a digital read-out over an analog read-out. This read-out is extremely useful, for example, as an indication of when the pipe section is approaching its specified elastic limit.

In operation, a section of pipe is sealed off and filled with water. The pump is then started. The dead weight tester is used to calibrate the pressure transducer. As the pump operates, the pressure rises causing the pen to travel as a function of pressure across the chart which is moving digitally as a function of volume. When a 200 p.s.i. incremental change has occurred the pen has traversed the chart and under the influence of potentiometer 17 returns once again to the left hand margin. Thus, a series of parallel diagonal lines are generated. When the limit of elasticity is reached, the line then being generated is no longer parallel to the other lines.

As an aid in determining the exact point at which the generated line deviates from the parallel means such as a transparent pattern having proper parallel diagonal lines thereon or a small mobile drafting machine is laid over the graph. This enables the immediate detection of the point where the strain is greater than the stress.

While the principles of the invention have been described above in connection with specific apparatus and applications, it is to be understood that this description is made only by way of example and not as a limitation on the scope of the invention.

What is claimed is:

1. A hydrostatic testing system for testing pressure vessels to determine characteristics affecting the reliability of the vessels, comprising manifold means for coupling fluid to the pressure vessel under test, positive displacement constant delivery pump means for transferring fixed volumes of the fluid to the pressure vessel through said manifold means, transducer means for measuring the pressure applied to said pressure vessel, means for recording the test results, said recording means comprising chart means and means for inscribing on said chart, servo system means for moving said inscribing means responsive to the output of said transducer means, digital means for measuring the revolutions of said pump means to provide a digital output which is a function of the volume of fluid transferred into said pressure vessel, and digital motor means for driving said chart responsive to the output of said digitally measuring means while said inscribing means inscribes the output of said pressure transducer means on said chart thereby providing a graph of the yield characteristics of said pressure vessel.

2. The hydrostatic testing system of claim 1 wherein said digital measuring means comprises cam means coupled to the shaft of said pump and magnetic pick-up means juxtaposed to said cam means for magnetically sensing each time said cam means passes said pick-up means to produce digital pulses.

3. The hydrostatic testing system of claim 2 and means for electronically varying the number of digital pulses produced by said pick-up means whereby said test system is amenable to testing pressure vessels of different sizes and materials with no mechanical changes.

4. The hydrostatic testing system of claim 3 wherein said electronic means comprises a series of bistable circuits connected as a counter and means for selecting an output from the input to any of said bistable circuits of said series.

5. The hydrostatic testing system of claim 1 wherein means are provided for returning said inscriber means to a starting position at a first edge of said graph after said inscriber reaches the far edge of said graph and wherein potentiometer means are connected to said transducer for varying the amplitude of the output of said transducer means when said inscriber means is returned to said first edge.

6. The hydrostatic testing system of claim 5 wherein said returning means comprises limit switch means operated when said inscriber means reaches said far edge and stepping solenoid means operated responsive to the operation of said limit switch for stepping said potentiometer to cancel some of the output voltage of said transducer to automatically vary the pressure scale on the chart.

7. The hydrostatic testing system of claim 1 and amplifier means connected to the output of said digital measuring means, synchronous clock means for producing a timed output, printing wheel means turned responsive to said timed output, print control means for operating said printing wheel to print on said chart, means coupling said print control means to said amplifier means to cause said print control means to operate said printing wheel to print responsive to said amplifier digital output.

8. The hydrostatic testing system of claim 7 wherein switch means are provided between said digital means and said amplifier means, time pulse generator means for providing digital pulses per unit time, means responsive to the operation of said switch means for coupling said amplifier to said time pulse generator means whereby the graph will record leakage characteristics when the switch is operated.

9. The hydrostatic testing system of claim 8 wherein counter means are coupled to the output of said amplifier for providing a visual display of time or volume.

References Cited

UNITED STATES PATENTS

| | | | |
|---|---|---|---|
| 2,628,498 | 2/1953 | Smith | 73—151.5 |
| 3,057,185 | 10/1962 | Van Horne et al. | 73—37 |
| 3,230,760 | 1/1966 | Fryer et al. | 73—37 |
| 3,245,253 | 4/1966 | Gruber | 73—89 X |
| 3,313,147 | 4/1967 | Rebbeck | 73—89 X |

FOREIGN PATENTS 528,456  11/1921  France.

LOUIS R. PRINCE, *Primary Examiner.*

DAVID SCHONBERG, *Examiner.*

JEFFREY NOLTON, *Assistant Examiner.*